US 6,737,482 B1

(12) United States Patent
Ando et al.

(10) Patent No.: US 6,737,482 B1
(45) Date of Patent: May 18, 2004

(54) CURABLE RESIN COMPOSITION

(75) Inventors: Katsuhiro Ando, Hyogo (JP); Toru Inaya, Hyogo (JP); Masato Kusakabe, Hyogo (JP); Hiroshi Iwakiri, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/889,587

(22) PCT Filed: Feb. 7, 2000

(86) PCT No.: PCT/JP00/00645

§ 371 (c)(1),
(2), (4) Date: Nov. 20, 2001

(87) PCT Pub. No.: WO00/46300

PCT Pub. Date: Aug. 10, 2000

(30) Foreign Application Priority Data

Feb. 5, 1999 (JP) ............................................. 11-028260

(51) Int. Cl.$^7$ ......................... C08L 83/12; C08L 63/00; C08G 77/38
(52) U.S. Cl. ............................ 525/476; 528/15; 528/25; 528/27; 528/29; 528/31
(58) Field of Search .................. 525/476; 528/15, 528/25, 27, 29, 31

(56) References Cited

U.S. PATENT DOCUMENTS

| 4,323,488 A | * | 4/1982 | Takago et al. ............. 528/32 |
| 4,657,986 A | | 4/1987 | Isayama et al. |
| 4,952,643 A | * | 8/1990 | Hirose et al. .............. 525/407 |
| 4,981,728 A | * | 1/1991 | Homma et al. ............. 427/386 |
| 5,296,582 A | * | 3/1994 | Fujita et al. ................ 528/27 |
| 5,342,914 A | * | 8/1994 | Iwakiri et al. .............. 528/32 |
| 5,684,094 A | * | 11/1997 | Suzuki et al. .............. 525/403 |
| 5,811,566 A | * | 9/1998 | Watabe et al. ............. 556/445 |
| 6,248,915 B1 | * | 6/2001 | Ito et al. ..................... 556/445 |

FOREIGN PATENT DOCUMENTS

| EP | 0 370 531 A2 | 5/1990 |
| JP | 61-268720 | 11/1986 |
| JP | 63-273629 | 11/1986 |
| JP | 63-097675 | 4/1988 |
| JP | 2-214759 | 8/1990 |
| JP | 3-263421 | 11/1991 |
| JP | 4-1220 | 1/1992 |
| JP | 4-292616 | 10/1992 |
| JP | 5-271389 | 10/1993 |
| JP | 7-179744 | 7/1995 |
| JP | 8-183939 | 7/1996 |
| WO | WO 91/15533 | 10/1991 |
| WO | WO 99/24489 | 5/1999 |

* cited by examiner

Primary Examiner—Jeffrey B. Robertson
(74) Attorney, Agent, or Firm—Westerman, Hattori, Daniels & Adrian, LLP

(57) ABSTRACT

The present invention is to provide a curable resin composition comprising (I) a reactive silicon group-containing polyoxyalkylene polymer wherein a introduction rate of a reactive silicon group into molecular chain terminus is not less than 85% as analyzed by $^1$H-NMR spectrometry and (II) an epoxy resin. The curable resin obtained from this composition reflects improvements in tensile strength and tensile shear bond strength and in adhesion to various substrates.

5 Claims, No Drawings

CURABLE RESIN COMPOSITION

TECHNICAL FIELD

The present invention relates to a curable resin composition which can be used broadly in various applications such as adhesives and coatings, has toughness and high bond strength, and shows good adhesion to various adherends.

BACKGROUND ART

Epoxy resin has been used in a broad spectrum of applications such as various molding materials, adhesives, coatings, plywood, laminates and so on but, because of its cured brittleness, has the drawback of low peel strength when used in adhesives and the like.

To overcome the above-mentioned drawback, it was proposed to achieve improvements in cured brittleness and peel strength by using a composition comprising a blend of such an epoxy resin with a reactive silicon group-containing polyoxyalkylene polymer which would give a rubber-like elastomer on curing at atmospheric temperature (e.g. Japanese Kokai Publication Sho-61-268720).

However, such a composition is inferior to a composition comprised of an epoxy resin alone in cured tensile strength and tensile shear bond strength so that it has not been used successfully in applications calling for high strength.

Japanese Kokoku Publication Hei-7-2828 proposes to facilitate handling before curing and, at the same time, improve the tensile characteristics, chemical resistance and water resistance by narrowing the molecular weight distribution of the reactive silicon group-containing polyoxyalkylene polymer in such a composition.

However, neither of the above publications refers to the relationship of the silicon group introduction rate of a reactive silicon group-containing polyoxyalkylene polymer to bond strength and adhesion.

SUMMARY OF THE INVENTION

The object of the present invention is to provide a curable resin composition reflecting improvements in cured tensile strength and tensile shear bond strength and in adhesion to various substrates while the toughness and high peel strength of a reactive silicon group-containing polyoxyalkylene polymer-epoxy resin blend are fully sustained.

The present invention, therefore, is directed to a curable resin composition comprising (I) a reactive silicon group-containing polyoxyalkylene polymer wherein the introduction rate of a reactive silicon group into a molecular chain terminus is not less than 85% as analyzed by $^1$H-NMR spectrometry and (II) an epoxy resin.

DETAILED DESCRIPTION OF THE INVENTION

The above object of the invention is accomplished by insuring that, in a curable resin composition comprising a reactive silicon group-containing polyoxyalkylene polymer and an epoxy resin, the introduction rate of the reactive silicon group into the molecular chain terminus of the former will be not less than 85% as analyzed by $^1$H-NMR spectrometry.

The term "reactive silicon group" in the context of the present invention means any group capable of forming a siloxane bond upon intergroup condensation and, as such, is not particularly restricted. However, the group represented by the following general formula (4) can be mentioned as a typical example.

$$-(Si(R^3{}_{2-b})(X_b)O)_m Si(R^4{}_{3-a})X_a \qquad (4)$$

(wherein $R^3$ and $R^4$ each represents an represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO-$; when two or more $R^3$ and $R^4$ groups are present, they may be the same or different; R' represents a univalent hydrocarbon group containing 1 to 20 carbon atoms and the three R' groups may be the same or different; X represents a hydroxyl group or a hydrolyzable group and when two or more X groups are present, they may be the same or different; a represents 0, 1, 2 or 3 and b represents 0, 1 or 2; as regards b in $-Si(R^3{}_{2-b})(X_b)-O-$ which occurs in m repeats, the value of b may be different over the repeats; m represents an integer of 0 to 19; provided, however, that the relation of $a+\Sigma b \geq 1$ is satisfied).

The hydrolyzable group mentioned above for X is not particularly restricted but can be a known hydrolyzable group. Thus, for example, hydrogen, halogen, alkoxy, acyloxy, ketoximato, amino, amido, acid amido, aminoxy, mercapto and alkenyloxy can be mentioned. Among these groups, in view of mild hydrolyzability and ease of handling, alkoxy groups such as methoxy, ethoxy, propoxy and isopropoxy are preferred.

The hydroxyl group and/or hydrolyzable group may be attached, in a varying number of 1 to 3, to one silicon atom but the $(a+\Sigma b)$ value is preferably in the range of 1 to 5. When two or more hydroxyl and/or hydrolyzable groups exist in the reactive silicon group, they may be the same or different.

The number of silicon atoms in the reactive silicon group may be one or more than one but, in the case of the reactive silicon group in which silicon atoms are linked by siloxane bonding or the like, may be about 20.

The reactive silicon group of the following general formula (5) is preferred from availability points of view.

$$-Si(R^4{}_{3-a})X_a \qquad (5)$$

(wherein $R^4$, X and a are as defined above)

Referring to the above general formulas (4) and (5), $R^3$ and $R^4$ each may be an alkyl group such as methyl or ethyl; a cycloalkyl group such as cyclohexyl; an aryl group such as phenyl; an aralkyl group such as benzyl; or a triorganosiloxy group represented by the formula $(R')_3SiO-$ in which R' stands for methyl or phenyl, for instance. Particularly preferred for $R^3$, $R^4$ and R' are methyl.

Referring to the polyoxyalkylene polymer (I), the introduction rate of the reactive silicon group of formula (4) or (5) into the molecular chain terminus is not less than 85% as analyzed by $^1$H-NMR spectrometry. By insuring that the introduction rate of the reactive silicon group is not less than 85%, tensile strength and tensile shear bond strength of the cured products as well as adhesion to various substrates thereof can be improved while the toughness and high peel strength can be sustained. If the above-mentioned introduction rate is less than 85%, tensile strength and tensile shear bond strength as well as adhesion to various substrates will not be sufficient so that the object of the invention will not be accomplished. The introduction rate of the reactive silicon group is preferably not less than 90% for expression of more satisfactory characteristics of the cured products, more preferably not less than 95% for expression of still better characteristics of the cured products. Still more preferred introduction rate is not less than 98%.

The introduction rate of such a reactive silicon group may be determined by various techniques but, as used in this specification, the term means the value found by $^1$H-NMR analysis of the reactive silicon group-containing polyoxyalkylene polymer (I). The introduction rate of the reactive silicon group can be defined as the value found by comparing, from $^1$H-NMR data, the integral value of the molecular chain termini into which the reactive silicon group has been introduced, with the integral value of the molecular chain termini into which the reactive silicon group has not been introduced and calculating the percentage of the termini into which the reactive silicon group has been introduced based on the total number of molecular termini.

The number of units of said reactive silicon group per molecule need be at least one but is preferably an average of 1.5 to 4 for insuring sufficient curability.

The main chain structure of the polyoxyalkylene polymer for use as the (I) component in the present invention need only to be a polymer exclusively composed of repeating units of —R—O— in which R may be a bivalent organic group containing 1 to 20 carbon atoms. Moreover, the polymer may be a homopolymer in which all repeating units are the same or a copolymer comprising 2 or more kinds of repeating units. Its main chain structure may even have a branched structure.

R specifically includes —CH$_2$CH$_2$—, —CH(CH$_3$)CH$_2$—, —CH(C$_2$H$_5$)CH$_2$—, —C(CH$_3$)$_2$CH$_2$— and —CH$_2$CH$_2$CH$_2$CH$_2$—, among others. The particularly preferred species of R is —CH(CH$_3$)CH$_2$—.

The main chain structure of the (I) component polyoxyalkylene polymer can be synthesized by, for example, the ring-opening polymerization of a monoepoxide in the presence of an initiator and a catalyst.

The initiator specifically includes di- and polyhydric alcohols such as ethylene glycol, propylene glycol, butanediol, hexamethylene glycol, methallyl alcohol, bisphenol A, hydrogenated bisphenol A, neopentyl glycol, polybutadiene diol, diethylene glycol, triethylene glycol, polyethylene glycol, polypropylene glycol, polypropylene triol, polypropylene tetraol, dipropylene glycol, glycerol, trimethylolmethane, trimethylolpropane, pentaerythritol, etc. and various hydroxyl-containing oligomers.

The monoepoxide specifically includes alkylene oxides, e.g. ethylene oxide, propylene oxide, α-butylene oxide, β-butylene oxide, hexene oxide, cyclohexene oxide, styrene oxide, α-methylstyrene oxide, etc.; and alkyl glycidyl ethers, e.g. methyl glycidyl ether, ethyl glycidyl ether, isopropyl glycidyl ether, butyl glycidyl ether, etc., allyl glycidyl ethers, and aryl glycidyl ethers.

The catalyst can be selected from among known catalysts, namely alkaline catalysts such as KOH, NaOH, etc.; acidic catalysts such as trifluoroborane-etherate etc.; aluminoporphyrin metal complex and double metal cyanide complex catalysts such as zinc cobalt cyanide-glyme complex catalyst etc. can be employed. The use of a double metal cyanide complex catalyst with a low risk for side reactions is preferred, although it is not an exclusive choice.

The main chain structure of the polyoxyalkylene polymer may also be obtained by subjecting a hydroxyl-terminated polyoxyalkylene polymer to chain extension with a bifunctional or polyfunctional alkyl halide, such as CH$_2$Cl$_2$, CH$_2$Br$_2$ or the like, in the presence of a basic compound, such as KOH, NaOH, KOCH$_3$, NaOCH$_3$ or the like.

The method of producing the polyoxyalkylene polymer for use as component (I) of the invention is not particularly restricted but includes various methods. Particularly, the method which comprises reacting (a) a polyoxyalkylene polymer terminating in an unsaturated group represented by the general formula (1):

$$H_2C=(R^1)-R^2-O-\qquad(1)$$

or general formula (2):

$$HC(R^1)=CH-R^2-O-\qquad(2)$$

(wherein R$^1$ represents a hydrocarbon group containing up to 10 carbon atoms and R$^2$ represents a bivalent organic group containing 1 to 20 carbon atoms and at least one member selected from the group consisting of hydrogen, oxygen and nitrogen as constituent atoms) with (b) a reactive silicon group-containing compound represented by the general formula (3):

$$H-(Si(R^3{}_{2-b})(X_b)O)_mSi(R^4{}_{3-a})X_a\qquad(3)$$
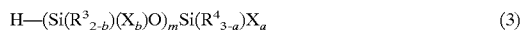

(wherein R$^3$, R$^4$, X, a, b and m are as defined above) in the presence of (c) a Group VIII transition metal catalyst is advantageous in that the reactive silicon group can be introduced into the molecular chain terminus at a rate of not less than 85%.

Regarding the method of synthesizing (a) said polyoxyalkylene polymer terminating in an unsaturated group represented by the above formula (1) or (2), various known reactions can be utilized. For example, the relevant hydroxy-terminated polyoxyalkylene polymer is reacted with a compound having an unsaturated group to introduce the unsaturated group by way of ether bonding, ester bonding, urethane bonding or carbonate bonding. To introduce an unsaturated group by ether bonding, there can for example be used a process which comprises converting the terminal hydroxyl group of the polyoxyalkylene polymer to the metalloxy group —OM (M=Na or K) and, then, reacting the same with an unsaturated group-containing compound represented by the general formula (6):

$$H_2C=C(R^1)-R^2-X\qquad(6)$$

or the general formula (7):

$$HC(R^1)=CH-R^2-X\qquad(7)$$

(wherein R$^1$ and R$^2$ are as defined above).

Referring to the above general formula (6) or (7), R$^1$ may for example be a straight-chain alkyl group, such as methyl, ethyl, propyl, butyl, pentyl, hexyl, heptyl, octyl, nonyl or decyl; a branched-chain alkyl group, such as isopropyl, isobutyl, isopentyl or isohexyl; or an aryl group, such as phenyl. It may be of only one kind or of more than one kind. From the standpoint of reactivity, methyl is particularly preferred. R$^2$ is a bivalent organic group containing 1 to 20 carbon atoms and includes but is not limited to —CH$_2$—, —C$_2$H$_4$—, —C$_3$H$_6$—, —C$_4$H$_8$—, —C$_5$H$_{10}$—, —C$_6$H$_{12}$—, —C$_7$H$_{14}$—, —C$_8$H$_{16}$—, —C$_9$H$_{18}$—, —C$_{10}$H$_{20}$—, —CH(CH$_3$)—, —CH$_2$—CH(CH$_3$)—, —CH$_2$—CH(CH$_3$)—CH$_2$—, —C$_2$H$_4$—CH(CH$_3$)—, —C$_5$H$_4$—, —CH$_2$—C$_6$H$_4$—, —CH$_2$—C$_6$H$_4$—CH$_2$— and —C$_2$H$_4$—C$_6$H$_4$—. In terms of the ease of synthesis, —CH$_2$—, —CH$_2$CH$_2$— or —CH$_2$CH(CH$_3$)— is preferred. Among them, —CH$_2$— is particularly preferred from availability points of view.

As specific examples of the unsaturated group-containing compound represented by the above general formula (6) or (7), there can be mentioned H$_2$C=C (CH$_3$)—CH$_2$—Cl, H$_2$C=C(CH$_3$)—CH$_2$—Br—, H$_2$C=C(CH$_2$CH$_3$)—CH$_2$—

Cl, H₂C=C(CH₂CH₃)—CH₂—Br, H₂C=C(CH₂CH(CH₃)₂) —CH₂—Cl, H₂C=C(CH₂CH(CH₃)₂) —CH₂—Br, HC(CH₃)=CH—CH₂—Cl and HC(CH₃)=CH—CH₂—Br, among others. From reactivity points of view, in particular, H₂C=C(CH₃)—CH₂—Cl or HC(CH₃)=CH—CH₂—Cl is preferred. From availability points of view and in terms of the ease of synthesis, H₂C=C(CH₃)—CH₂—Cl is particularly preferred.

The method for introduction of the unsaturated group includes not only the above method but also the method using an isocyanate compound, carboxylic acid or epoxy compound having the group H₂C=C(CH₃)—CH₂—, HC(CH₃)=CH—CH₂— or the like.

The (b) component reactive silicon group containing compound need only to be a compound having at least one silicon group bound to said hydroxyl group and/or hydrolyzable group and at least one Si—H group per molecule. As representative examples, compounds of the following general formula (3) can be mentioned.

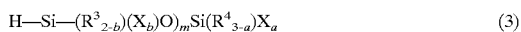

(3)

From availability points of view, in particular, a compound of the general formula (8) is preferred.

(8)

(wherein $R^3$, $R^4$, X, a, b and m are as defined above)

As specific examples of the compound of the general formula (3) or (8), there can be mentioned halosilanes such as trichlorosilane, methyldichlorosilane, dimethylchlorosilane, phenyldichlorosilane, trimethylsiloxymethylchlorosilane, 1,1,3,3-tetramethyl-1-bromodisiloxane, etc.; alkoxysilanes such as trimethoxysilane, triethoxysilane, methyldiethoxysilane, methyldimethoxysilane, phenyldimethoxysilane, trimethylsiloxymethylmethoxysilane, trimethylsiloxydiethoxysilane, etc.; acyloxysilanes such as methyldiacetoxysilane, phenyldiacetoxysilane, triacetoxysilane, trimethylsiloxymethylacetoxysilane, trimethylsiloxydiacetoxysilane, etc.; ketoximatosilanes such as bis(dimethylketoximato)methylsilane, bis(cyclohexylketoximato)methylsilane, bis(diethyl-ketoximato) trimethylsiloxysilane, bis(methylethyl-ketoximato) methylsilane, tris(acetoximato)silane, etc.; and alkenyloxysilanes such as methylisopropenyloxysilane, among others. Among these, alkoxysilanes are preferred, and as to species of alkoxy groups, methoxy is particularly preferred.

As the Group VIII transition metal catalyst (c), a metal complex catalyst comprising a metal selected from the group consisting of Group VIII transition metal elements such as platinum, rhodium, cobalt, palladium and nickel can be effectively employed. Thus, for example, $H_2PtCl_6 \cdot 6H_2O$, platinum-vinylsiloxane complexes, platinum-olefin complexes, Pt metal, and various other compounds such as RhCl (PPh₃)₃, RhCl₃, Rh/Al₂O₃, RuCl₃, IrCl₃, FeCl₃, PdCl₂·2H₂O, NiCl₂, etc. can be employed. However, in terms of the reactiveity of hydrosilylation, the use of a platinum-vinylsiloxane complex or a platinum-olefin complex is particularly preferred. The platinum-vinylsiloxane complex mentioned above is a generic term denoting various compounds having a vinyl-containing siloxane, polysiloxane or cyclic siloxane group as the ligand to a platinum atom, thus including 1,1,3,3-tetramethyl-1,3-divinyldisiloxane, 1,3,5,7-tetravinyl-1,3,5,7-tetramethylcyclotetrasiloxane and so on. As specific examples of the olefin ligand of said platinum-olefin complex, there can be mentioned 1,5-hexadiene, 1,7-octadiene, 1,9-decadiene, 1,11-dodecadiene, 1,5-cyclooctadiene and so on. Particularly preferred, among these ligands, is 1,9-decadiene.

The platinum-vinylsiloxane complexes and platinum-olefin complexes are disclosed in Japanese Kokoku Publication Hei-8-9006.

The level of use of the catalyst is not particularly restricted but it is generally preferable to use $10^{-1}$ to $10^{-8}$ mole of the platinum catalyst per mole of the alkenyl group, and the more preferred range is $10^{-3}$ to $10^{-6}$ mole. When the amount of the catalyst is too small, the hydrosilylation reaction may not proceed sufficiently. Use of the catalyst in an excessively large amount leads to an increased cost burden and an increased catalyst residue in the product.

The hydrosilylation reaction is usually carried out in the temperature range of 10 to 150° C., preferably at 20 to 120° C., more preferably at 40 to 10° C. Depending on the need for control of the reaction temperature and reaction system viscosity, such a solvent as benzene, toluene, xylene, tetrahydrofuran, methylene chloride, pentane, hexane or heptane can be employed.

As the catalyst for hydrosilylation reaction, AlCl₃, TiCl₄ or the like can also be used.

For accelerating the hydrosilylation reaction, reactivation of the catalyst with oxygen (Japanese Kokai Publication Hei-8-283339) or addition of sulfur is a recommendable procedure. The addition of sulfur leads to a curtailed production time without involving a cost increase due to an increased consumption of the platinum catalyst and the consequent need for removal of catalyst residues, thus contributing to reduced production cost and enhanced productivity.

The sulfur compound for use includes elemental sulfur, thiols, sulfides, sulfoxides, sulfones and thioketones. Elemental sulfur is preferred, although it is not an exclusive choice. In adding a sulfur compound to the liquid-phase reaction system, the compound may be dissolved in advance, for example in a portion of the reaction mixture or solvent, to thereby be uniformly dispersed throughout the system. For example, the sulfur compound can be dissolved in an organic solvent such as toluene, hexane or xylene and then added to the reaction system.

The level of addition of the sulfur compound may be selected within the range of 0.1 to 10 molar equivalents relative to the metal catalyst, 0.002 to 0.1 molar equivalents relative to the alkenyl group, or 1 to 500 ppm based on the total weight of the reaction mixture. If the level of addition of sulfur is too low, the effect may not be sufficiently expressed. Conversely if the level is too high, the catalyst activity tends to be sacrificed or the progress of reaction hindered. Therefore, it is advisable to select the level of addition with prudence.

The hydrosilylation reaction can be carried out in the absence of a solvent or in the presence of a solvent. The hydrosilylation solvent can be usually selected from among hydrocarbons, halogenated hydrocarbons, ethers and esters, although the use of heptane, hexane, benzene, toluene or xylene is preferred.

The reactor plenum gas for the hydrosilylation reaction may be exclusively composed of an inert gas, such as nitrogen gas or helium gas, or may contain oxygen or the like. From the standpoint of safety in the handling of inflammable substances, the hydrosilylation reaction is often carried out in the presence of an inert gas such as nitrogen gas or helium gas. However, when the plenum gas comprises an inert gas such as nitrogen gas or helium gas, the velocity of hydrosilylation tends to be decreased depending on reaction conditions.

The hydrosilylation reaction can be safely accelerated even in the presence of oxygen by setting the oxygen concentration of the reactor plenum gas at a level avoiding formation of an explosive mixture. The oxygen concentration of the plenum gas may for example be 0.5 to 10%.

In order to preclude the oxidation of the polyoxyalkylene polymer and/or reaction solvent by the plenum oxygen, the hydrosilylation reaction can be carried out in the presence of an oxidation inhibitor. The oxidation inhibitor includes phenolic antioxidants having a radical chain terminator function, such as 2,6-di-tert-butyl-p-cresol, 2,6-di-tert-butylphenol, 2,4-dimethyl-6-tert-butylphenol,
2,2'-methylenebis(4-methyl-6-tert-butylphenol),
4,4'-butyridenebis(3-methyl-6-tert-butylphenol),
4,4'-thiobis(3-methyl-6-tert-butylphenol),
tetrakis {methylene-3(3,5-di-tert-butyl-4-hydroxyphenyl) propionate}methane, and
1,1,3-tris(2-methyl-4-hydroxy-5-tert-butylphenyl)butane, among others. As a radical chain terminator function, amine
antioxidants such as phenyl-β-naphthylamine, α-naphthylamine,
N,N'-di-sec-butyl-p-phenylenediamine, phenothiazine and
N,N'-diphenyl-p-phenylenediamine, can be likewise employed. However, these inhibitors are not exclusive choices.

The above mentioned polyoxyalkylene polymer (I) may be used as a single compound or a plurality of compounds.

The particularly preferred reactive silicon group-containing molecular chain terminus of the reactive silicon group-containing polyoxyalkylene polymer (I) is one of the following formula. Since such terminal structure does not contain an ester linkage or an amide linkage, the cured product may have good weather resistance, among other properties. $(CH_3O)_2Si(CH_3)—CH_2—CH(CH_3)—CH_2—O—$ The molecular weight of the polyoxyalkylene polymer (I) is not particularly restricted but its number average molecular weight is preferably 1,000 to 100,000. When the number average molecular weight is less than 1,000, the cured product of the reactive silicon group-containing polyoxyalkylene polymer is brittle. When it exceeds 100,000, the concentration of the functional group is so low that the cure speed is decreased and, moreover, the polymer is increased so much in viscosity that it cannot be easily handled. In terms of the viscosity of the produced reactive silicon group-containing polyoxyalkylene polymer, said molecular weight is preferably 1,000 to 50,000. For the expression of useful mechanical properties, said molecular weight of 5,000 to 50,000 is particularly preferred.

In this specification, the number average molecular weight of the polyoxyalkylene polymer is defined as the number average molecular weight value found by a direct titrimetic end-group determination based on the principle of the method for determination of the hydroxyl value as directed in JIS K1557 or the method for determination of the iodine value as directed in JIS K0070 and taking the structure of the polyoxyalkylene polymer into consideration. An indirect method which can also be used for the determination of the number average molecular weight comprises constructing a calibration curve from the polystyrene equivalent molecular weight determined by the standard GPC method and the above end-group molecular weight and converting the GPC molecular weight to the end-group molecular weight.

As the (1) component, a modification product derived from the reactive silicon group-containing polyoxyalkylene polymer can also be employed. As a representative example of such modification product, there can be mentioned the polymer obtainable by polymerizing a mixture of an alkyl (meth) acrylate monomer having an alkyl group containing 1 to 8 carbon atoms as represented by the following general formula (9) and/or an acrylic (meth)acrylate monomer having an alkyl group containing 10 or more carbon atoms as represented by the following general formula (10) and/or a reactive silicon group-containing alkyl (meth)acrylate monomer of the following general formula (11) in the presence of the reactive silicon group-containing polyoxyalkylene polymer. Aside from the above, it is also possible to use blends of the reactive silicon group-containing polyoxyalkylene polymer with polymers of the following compound (9), (10) and/or (11).

(wherein $R^5$ represents a hydrogen atom or a methyl group; $R^6$ represents an alkyl group containing 1 to 8 carbon atoms)

(wherein $R^5$ represents a hydrogen atom; $R^7$ represents an alkyl group containing not less than 10 carbon atoms)

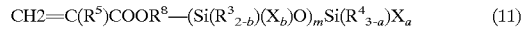

(wherein $R^5$ is as defined above; $R^8$ represents a bivalent alkylene group containing 1 to 6 carbon atoms; $R^3$, $R^4$, X, a, b and m are as defined above).

Referring to the above general formula (9), $R^6$ is an alkyl group containing 1 to 8 carbon atoms such as methyl, ethyl, propyl, n-butyl, t-butyl, 2-ethylhexyl or the like, preferably an alkyl group containing 1 to 4 carbon atoms, more preferably an alkyl group containing 1 to 2 carbon atoms. The monomer represented by the general formula (9) maybe a single compound or a plurality of compounds.

Referring to the above general formula (10), $R^7$ is an alkyl group containing 10 or more carbon atoms, usually a long-chain alkyl group containing 10 to 30 carbon atoms, preferably 10 to 20 carbon atoms, such as lauryl, tridecyl, cetyl, stearyl, biphenyl, and so on. The monomer represented by the general formula (10) maybe a single compound or a plurality of compounds.

Referring to the above general formula (11), $R^8$ may be a group containing 1 to 6 carbon atoms, preferably 1 to 4 carbon atoms, such as methylene, ethylene, propylene or the like. The reactive silicon group bound to Re includes trimethoxysilyl, methyldimethoxysilyl, triethoxysilyl and methyldiethoxysilyl, among others. With regard to the monomer represented by general formula (11), it may be one or plural.

In conducting this polymerization reaction, a monomer other than those of formula (9), formula (10) and formula (11) can also be used. As such monomers, there can be mentioned acrylic acid monomers such as acrylic acid and methacrylic acid; amido-containing monomers such as acrylamide, methacrylamide, N-methylolacrylamide, N-methylolmethacrylamide, etc.; epoxy-containing monomers such as glycidyl acrylate, glycidyl methacrylate, etc.; amino-containing monomers such as diethylaminoethyl acrylate, diethylaminoethyl methacrylate, aminoethyl vinyl ether, etc.; acrylonitrile, styrene, α-methylstyrene, alkyl vinyl ethers, vinyl chloride, vinyl acetate, vinyl propionate and ethylene, among others. In such cases, it is preferred that the total amount of the monomers of formula (9), formula (10) and/or formula (11) will account for not less than 50 weight %, particularly not less than 70 weight %, of the whole monomer charge polymerized.

As the (II) component epoxy resin, various known resins can be liberally used. For example, bisphenol A type epoxy resin, bisphenol F type epoxy resin, bisphenol AD type epoxy resin, bisphenol S type epoxy resin, the corresponding hydrogenated epoxy resins, glycidyl ester type epoxy resin, glycidylamine type epoxy resin, alicyclic epoxy resin, novolac type epoxy resin, urethane-modified epoxy resin obtained by terminal epoxidization of a urethane prepolymer, fluorinated epoxy resin, polybutadiene- or NBR-containing rubber-modified epoxy resin, tetrabromobisphenol A glycidyl ether and other flame-retarded epoxy resin and so on can be mentioned.

The level of use of the (II) component is 0.1 to 500 parts, preferably 10 to 200 parts, based on 100 weight parts of the (I) component polyoxyalkylene polymer. If the level is below 0.1 part, no sufficient tensile shear bond strength may be obtained. Exceeding 500 parts is also undesirable, for decreases in peel bond strength, among other adverse effects, may develop in some cases.

In the present invention, for improving the compatibility of polyoxyalkylene polymer (I) and epoxy resin (II) and enhancing the adhesive property of the formulation, among other purposes, a compound having both a functional group capable of reacting with an epoxy group and a reactive silicon group or a compound having both an epoxy group and a reactive silicon group can be further formulated.

As specific examples of said compound having both a functional group capable of reacting with an epoxy group and a reactive silicon group or said compound having both an epoxy group and a reactive silicon group, there can be mentioned amino-containing silanes, such as γ-aminopropyltrimethoxysilane, γ-aminopropylmethyldimethoxysilane, γ-(2-aminoethyl) aminopropyl-trimethoxysilane, γ-(2-aminoethyl) aminopropylmethyl-dimethoxysilane, γ(2-aminoethyl) aminopropyltriethoxysilane, γ-ureidopropyltriethoxysilane, N-β-(N-vinylbenzylaminoethyl)-γ-aminopropyltrimethoxysilane, γ-anilinopropyltrimethoxysilane, etc.; mercapto-containing silanes, such as γ-mercaptopropyltrimethoxysilane, γ-mercaptopropyltriethoxysilane, γ-mercaptopropylmethyldimethoxysilane, γ-mercaptopropylmethyldiethoxysilane, etc.; epoxy-containing silanes, such as γ-glycidoxypropyltrimethoxysilane, γ-glycidoxypropylmethyldimethoxysilane, γ-glycidoxypropyltriethoxysilane, β-(3,4-epoxycyclohexyl)ethyltrimethoxysilane, etc.; carboxysilanes, such as β-carboxyethylphenylbis(2-methoxyethoxy)silane, N-β-(N-carboxymethylamino-ethyl)-γ-aminopropyltrimethoxysilane, etc.; and ketiminosilanes obtained by dehydrative condensation of an amino-containing silane with various ketones. In the present invention, these silicon compounds may be used each independently or in a combination of two or more species. With the combined amount of (I) and (II) components being taken as 100 parts, such silicon compound is formulated generally within the range of about 0.1 to 20 parts, preferably in the range of about 0.2~10 parts.

The curable resin composition of the present invention may optionally be supplemented with a silanol condensation catalyst, an epoxy resin curing agent, and other additives such as filler, plasticizer, solvent and so on.

The silanol condensation catalyst includes organotin compounds, acidic phosphoric acid esters, reaction products of acidic phosphoric acid esters with an amine, saturated or unsaturated polycarboxylic acids and acid anhydrides thereof, and organic titanate compounds, among others. These catalysts can be used each independently or in a combination of two or more species.

The epoxy resin curing agent includes aliphatic amines, alicyclic amines, aromatic amines, polyaminoamides, imidazoles, dicyandiamides, epoxy-modified amines, Mannich-modified amines, Michael addition-modified amines, ketimines, acid anhydrides, alcohols and phenols, among others. These curing agents can be used each independently or in a combination of two or more species.

The filler specifically includes calcium carbonate, kaolin, talc, silica, titanium dioxide, aluminum silicate, magnesium oxide, zinc oxide and carbon black, among others. These fillers may be used each independently or in a combination of two or more species.

The plasticizer includes phthalic acid esters, non-aromatic dibasic acid esters and phosphoric esters, among others. As the plasticizer of the comparatively high molecular weight type, polyesters of dibasic acids with a dihydric alcohol, polypropylene glycol and its derivatives, and polystyrene, among others, can be mentioned. These plasticizers can be used each independently or in a combination of two or more species.

The solvent includes non-reactive solvents such as hydrocarbons, acetic acid esters, alcohols, ethers and ketones and such solvents can be used without any particular restriction.

As other additives, there can be mentioned antisagging agents, such as hydrogenated castor oil, organic bentonite, calcium stearate, etc., coloring agents, antioxidants, ultraviolet absorbers, light stabilizers and tackifying agents.

The method of producing the curable resin composition comprising said (I) and (II) components according to the invention is not particularly restricted but the conventional methods can be utilized. A typical method comprises blending (I) and (II) components and kneading the blend by means of a mixer, a roll or a kneader at room temperature or under heating or dissolving said (I) and (II) components in small quantities of a suitable solvent and mixing the same.

BEST MODE FOR CARRYING OUT THE INVENTION

The following examples are intended to illustrate the present invention in further detail and should by no means be construed as defining the scope of the invention.

Example of Synthesis-1

Using polypropylene glycol as the initiator and zinc hexacyanocobaltate-glyme complex as the catalyst, propylene oxide was polymerized to give polyoxypropylene glycol having an average molecular weight of 10,000. Then, based on the hydroxyl group of this hydroxy-terminated polyether oligomer, 1.2 equivalents of NaOMe/methanol was added. After the methanol was distilled off, 3-chloro-2-methyl-1-propene was added to the residue to covert the terminal hydroxyl group to the methallyl group. To 500 g of the resulting oligomer was added 10 g of hexane, and the mixture was subjected to azeotropic dehydration at 90° C. The hexane was distilled off under reduced pressure and the reaction vessel was purged with 8% $O_2/N_2$. Then, 25 μl of sulfur (1 wt. % in toluene) and 56 μl of platinum-divinyldisiloxane complex (ligand: 1,1,3,3-tetramethyl-1,3-divinyldisiloxane; 3wt. % as platinum in xylene) were added and 24.2 g of DMS (dimethoxymethylsilane) was added gradually under constant stirring. The reaction was continued at 90° C. for 5 hours, after which the unreacted DMS was distilled off under reduced pressure to give a reactive silicon group-containing polyoxypropylene polymer. As the polymer analyzed by $^1$H-NMR spectrometry, the introduction rate of the reactive silicon group into the terminus was 98%. The number average molecular weight of the same was about 10,000 (Polymer A).

Example of Synthesis-2

Using polypropylene glycol as the initiator and zinc hexacyanocobaltate-glyme complex as the catalyst, propylene oxide was polymerized to give polyoxypropylene glycol having an average molecular weight of 20,000. Then, based on the hydroxyl group of this hydroxy-terminated polyether oligomer, 1.2 equivalents of NaOMe/methanol was added. After the methanol was distilled off, 3-chloro-2-methyl-1-propene was added to the residue to covert the terminal hydroxyl group to the methallyl group. To 500 g of the resulting oligomer was added 10 g of hexane, and the mixture was subjected to azeotropic dehydration at 90° C. The hexane was distilled off under reduced pressure and the reaction vessel was purged with 8% $O_2/N_2$. Then, 24 μl of sulfur (1 wt. % in toluene) and 54 μl of platinum-divinyldisiloxane complex (ligand: 1,1,3,3-tetramethyl-1,3-divinyldisiloxane; 3wt. % as platinum in xylene) were added and 11.5 g of DMS (dimethoxymethylsilane) was added gradually under constant stirring. The reaction was continued at 90° C. for 10 hours, after which the unreacted DMS was distilled off under reduced pressure to give a reactive silicon group-containing polyoxypropylene polymer. As the polymer analyzed by $^1$H-NMR spectrometry, the introduction rate of the reactive silicon group into terminus was 98%. The number average molecular weight of the same was about 20,000 (Polymer B).

Example of Synthesis-3

Using polypropylene glycol as the initiator and zinc hexacyanocobaltate-glyme complex as the catalyst, propylene oxide was polymerized to give polyoxypropylene glycol having an average molecular weight of 10,000. Then, based on the hydroxyl group of this hydroxy-terminated polyether oligomer, 1.2 equivalents of NaOMe/methanol was added. After the methanol was distilled off, 3-chloro-1-propene was added to the residue to covert the terminal hydroxyl group to the allyl group. To 500 g of the resulting oligomer was added 10 g of hexane, and the mixture was subjected to azeotropic dehydration at 90° C. The hexane was distilled off under reduced pressure and the reaction vessel was purged with $N_2$. Then, 30 μl of platinum-divinyldisiloxane complex (ligand: 1,1,3,3-tetramethyl-1,3-divinyldisiloxane; 3 wt. % as platinum in xylene) was added and 9.0 g of DMS (dimethoxymethylsilane) was added gradually under constant stirring. The reaction was continued at 90° C. for 2 hours, after which the unreacted DMS was distilled off under reduced pressure to give a reactive silicon group-containing polyoxypropylene polymer. As the polymer analyzed by $^1$H-NMR spectrometry, the introduction rate of the reactive silicon group into terminus was 82%. The number average molecular weight of the same was about 10,000 (Polymer C).

Example 1

Using Polymer A, a one-component composition was prepared according to the recipe shown in Table 1 (all parts by weight) and evaluated for the following parameters. The results are shown in Table 2.

(1) Tensile Characteristics of the Cured Products

The curable resin composition was caused to cure in a thickness of 3 mm (23° C.×3 days+50° C.×4 days) and No. 3 dumbbell specimens were punched out in accordance with JIS K 6301 and subjected to tensile testing at a pulling speed of 200 mm/min for the determination of 50% modulus in tension (M50), 100% modulus in tension (M100), tensile strength at break (TB) and elongation at break (EB).

(2) Bond Strength

Tensile shear bond strength and peel bond strength (180°) were evaluated. For the evaluation of tensile shear bond strength, the curable resin composition was coated in a thickness of 60 μm on various substrates (aluminum A1050P, stainless steel sheet SUS304, cold-rolled steel sheet, PVC, acrylic resin and birch wood, dimensions: 100×25×2 mm) and, after curing (23° C.×3 days+50° C.×4 days), a tensile test was carried out at a pulling speed of 50 mm/min. For the evaluation of peel bond strength, the curable resin composition was coated in a thickness of about 60 μm or 2 mm on the aluminum sheet A1050P according to JIS H 4000 (200×25×0.1 mm) and, after curing (23° C.×3 days+50° C.×4 days), a tensile test was carried out using a pulling speed of 200 mm/min. In the table, CF stands for cohesive failure, TF for thin-layer failure, AF for adhesive failure, and MF for material failure. The indication CF90AF10, for instance, means that, of the bond failure, 90% is cohesive failure CF and 10% is adhesive failure AF.

Example 2

Using Polymer B, the procedure of Example 1 was otherwise repeated. The results are shown in Table 2.

Comparative Example 1

Using Polymer C, the procedure of Example 1 was otherwise repeated. The results are shown in Table 2.

TABLE 1

Recipes for one-component curable resin systems

|  |  | Example | | Comparative Example |
|---|---|---|---|---|
|  |  | 1 | 2 | 1 |
| Polymer A |  | 100 |  |  |
| Polymer B |  |  | 100 |  |
| Polymer C |  |  |  | 100 |
| Epoxy resin | Epikote 828[1] | 30 | 30 | 30 |
| Ketimine | Epicure H-30[1] | 15 | 15 | 15 |
| Sn catalyst | SCAT-1[2] | 2 | 2 | 2 |
| Reactive Si group-containing compound | A-187[3] | 3 | 3 | 3 |
|  | A-171[3] | 3 | 3 | 3 |
| Epoxy diluent | Epolite M-1230[4] | 3 | 3 | 3 |
| Solvent | Methyl isobutyl | 4 | 4 | 4 |

TABLE 1-continued

Recipes for one-component curable resin systems

|  |  | Example 1 | Example 2 | Comparative Example 1 |
|---|---|---|---|---|
| Colloidal calcium carbonate | ketone Hakuenka CCR[5] | 120 | 120 | 120 |

[1] product of Yuka-Shell Epoxy Co.
[2] product of Sankyo Organic Synthesis Co.
[3] product of Nippon Unicar Co.
[4] product of Kyoeisha Chemical Co
[5] product of Shiraishi Industry Co.

TABLE 2

Results of evaluation of one-component systems

|  |  |  | Example 1 | Example 2 | Comparative Example 1 |
|---|---|---|---|---|---|
| Dumbbell tensile characteristics | M50 | MPa | 3.20 | 1.95 | 2.20 |
|  | M100 | MPa | — | 2.54 | 3.05 |
|  | TB | MPa | 3.25 | 3.38 | 3.12 |
|  | EB |  | 55 | 230 | 100 |
| Tensile shear strength (coating thickness: 60 μm) | Aluminum | MPa | 6.01 (CF) | 6.61 (CF) | 5.46 (CF) |
|  | SUS | MPa | 4.75 (CF) | 4.83 (CF) | 4.13 (CF) |
|  | Steel sheet | MPa | 4.60 (CF) | 4.79 (CF) | 4.23 (CF) |
|  | PVC | MPa | 3.22 (CF) | 3.83 (CF) | 2.68 (CF90AF10) |
|  | Acrylic | MPa | 3.36 (CF) | 3.46 (CF) | 3.08 (CF) |
|  | Birch wood | MPa | 4.00 (CF) | 4.13 (CF) | 3.90 (CF) |
| T-peel strength | N/25 mm |  | 35.8 (CF) | 50.6 (CF) | 34.6 (CF) |

CF: Cohesive failure, TF: Thin-layer failure, AF: Adhesive failure, MF: Material failure

Example 3

Except that a two-component composition was prepared according to the recipe shown in Table 3 (all parts by weight) the bond strength characteristics were evaluated as in Example 1. The results are shown in Table 4.

Example 4

Using Polymer B, the procedure of Example 3 was otherwise repeated. The results are shown in Table 4.

Comparative Example 2

Using Polymer C, the procedure of Example 3 was otherwise repeated. The results are shown in Table 4.

TABLE 3

Recipes for two-component curable resin systems

|  |  |  | Example 3 | Example 4 | Comp. Exam. 2 |
|---|---|---|---|---|---|
| Main agent | Polymer A |  | 100 |  |  |
|  | Polymer B |  |  | 100 |  |
|  | Polymer C |  |  |  | 100 |
|  | Colloidal calcium carbonate | Calfine 200M[1] | 98 | 98 | 98 |
|  | Tertiary amine curing agent | TAP[2] | 5 | 5 | 5 |
|  | Reactive Si group-containing compound | A-1100[3] | 3 | 3 | 3 |
|  |  | A-171[3] | 3 | 3 | 3 |
|  | Antioxidant | Nocrac NS-6[4] | 3 | 3 | 3 |
|  | Thixotropic agent | Disparlon 305[5] | 4 | 4 | 4 |
| Curing agent | Epoxy resin | Epikote 828[6] | 50 | 50 | 50 |
|  | Colloidal calcium carbonate | Calfine 200M[1] | 40 | 40 | 40 |
|  | Heavy calcium carbonate | Whiton SB[7] | 13 | 13 | 13 |
|  | Sn catalyst | SCAT-1[8] | 1 | 1 | 1 |
|  | — | 2-Ethylhexanoic acid | 1 | 1 | 1 |

[1] product of Maruo Calcium Co.
[2] product of Kayaku-Aczo Co.
[3] product of Nippon Unicar Co.
[4] product of Ouchi Shinko Kagaku Co.
[5] product of Kusumoto Kasei Co.
[6] product of Yuka-Shell Epoxy Co.
[7] product of Shiraishi Calucium Co.
[8] product of Sankyo Organic Synthesis Co.

TABLE 4

Results of evaluation of two-component systems

|  |  |  | Example 3 | Example 4 | Comparative Example 2 |
|---|---|---|---|---|---|
| Dumbbell tensile characteristics | M50 | MPa | — | 3.23 | 3.82 |
|  | M100 | MPa | — | 3.70 | — |
|  | TB | MPa | 3.84 | 3.90 | 4.00 |
|  | EB | % | 47 | 120 | 64 |
| Tensile shear strength (coating thickness: 60 μm) | Aluminum | MPa | 6.35 (CF) | 7.47 (CF) | 5.50 (CF) |
|  | PVC | MPa | 3.99 (CF) | 4.42 (CF) | 3.59 (CF) |
|  | Acrylic | MPa | 3.82 (CF) | 4.01 (MF) | 3.68 (CF90AF10) |
|  | Birchwood | MPa | 4.84 (CF) | 5.12 (CF) | 4.13 (CF) |
| Tensile shear strength (coating thickness: 2 mm) | Aluminum | MPa | 3.75 (CF) | 3.98 (CF) | 3.69 (CF) |
|  | PVC | MPa | 3.50 (CF) | 3.65 (CF) | 3.24 (TF) |
|  | Acrylic | MPa | 2.97 (CF) | 3.33 (MF) | 2.56 (CF10TF60AF40) |
|  | Birchwood | MPa | 3.46 (CF) | 3.62 (CF) | 3.31 (CF) |
| T-peel strength | N/25 mm |  | 45.2 (CF) | 67.8 (CF) | 41.0 (CF) |

CF: Cohesive failure, TF: Thin-layer failure, AF: Adhesive failure, MF: Material failure It will be apparent from Tables 2 and 4 that Examples are superior to Comparative Example in tensile shear bond strength and T-peel bond strength, indicating that improvements have been obtained in bond strength and toughness. Moreover, while metals, plastics and wood were used as substrates in the tensile sheer test, the results indicate that whereas adhesive failure (AF) and thin-layer failure (TF) were partly noted in Comparative Example, the mode of failure in Examples was cohesive failure (CF) for the most part, indicating improvements in adhesion to various substrates.

INDUSTRIAL APPLICABILITY

In accordance with the invention, there can be provided a curable resin composition reflecting improvements in cured tensile strength and tensile shear bond strength and in adhesion to various substrates while the toughness and high peel strength of a reactive Si group-containing polyoxyalkylene polymer-epoxy resin blend are fully sustained.

What is claimed is:

1. A curable resin composition comprising:
   (I) a reactive silicon group-containing polyoxyalkylene polymer wherein an introduction ratio of a reactive silicon group into molecular chain termini, defined as the percentage of the termini into which the reactive silicon group has been introduced based on the total number of molecular chain termini, is not less than 95% as determined by $^1$H-NMR analysis, and
   (II) an epoxy resin.

2. The curable resin composition according to claim 1 wherein the reactive silicon group-containing polyoxyalkylene polymer (I) is obtained by reacting (a) a polyoxylalkylene polymer terminating in an unsaturated group of either the general formula (1):

$$H_2C\!=\!(R^1)\!-\!R^2\!-\!O\!- \qquad (1)$$

in the formula $R^1$ represents a hydrocarbon group containing not more than 10 carbon atoms; $R^2$ represents a divalent organic group containing 1 to 20 carbon atoms which contains one or more members selected from the group consisting of hydrogen, oxygen and nitrogen as the constituent atoms, or the general formula (2):

$$HC(R^1)\!=\!CH\!-\!R^2\!-\!O\!- \qquad (2)$$

in the formula $R^1$ represents a hydrocarbon group containing not more than 10 carbon atoms; $R^2$ represents a divalent organic group containing 1 to 20 carbon atoms which contains one or more members selected from the group consisting of hydrogen, oxygen and nitrogen as the constituent atoms, with (b) a reactive silicon group-containing compound of the general formula (3):

$$H\!-\!Si\!-\!(R^3{}_{2-b})(X_b)O)_m Si(R^4{}_{3-a})X_a \qquad (3)$$

in the formula $R^3$ and $R^4$ each represents an alkyl group containing 1 to 20 carbon atoms, an aryl group containing 6 to 20 carbon atoms, an aralkyl group containing 7 to 20 carbon atoms, or a triorganosiloxy group of the formula $(R')_3SiO\!-\!$; when two or more $R^3$ to $R^4$ groups are present, they may be the same or different; $R^1$ represents a univalent hydrocarbon group of 1 to 20 carbon atoms; the three of R' groups may be the same or different; X represents a hydroxyl group or a hydrolyzable group; when two or more X groups are present, they may be the same or different; a represents 0, 1, 2 or 3; b represents 0, 1 or 2; b may be the same or different over m repeats of $-\!Si(R^3{}_{2-b})(X_b)\!-\!O\!-\!$; m represents an integer of 0 through 19; provided, however, that the condition of $a+\Sigma b \geq 1$ is satisfied, (c) in the presence of a Group VIII transition metal catalyst.

3. The curable resin composition according to claim 1 or 2 wherein a reactive silicon group-containing molecular chain terminus of the reactive silicon group-containing polyoxyalkylene polymer (I) is represented by the following formula;

$$(CH_3O)_2Si(CH_3)\!-\!CH_2\!-\!CH(CH_3)\!-\!CH_2\!-\!O\!-\!.$$

4. The curable resin composition according to claim 1 or 2 comprising a compound having both a functional group capable of reacting with an epoxy group and a reactive silicon group or a compound having both an epoxy group and a reactive silicon group.

5. The curable resin composition according to claim 1 wherein the introduction ratio of a reactive silicon group into molecular chain termini is not less than 98%.

* * * * *